(12) United States Patent
Nakano et al.

(10) Patent No.: US 8,498,348 B2
(45) Date of Patent: Jul. 30, 2013

(54) RADIO BASE STATION AND METHOD OF CONTROLLING RADIO BASE STATION

(75) Inventors: Takeshi Nakano, Yokohama (JP);
Mitsuharu Senda, Yokohama (JP)

(73) Assignee: Kyocera Corporation, Kyoto (JP)

( * ) Notice: Subject to any disclaimer, the term of this patent is extended or adjusted under 35 U.S.C. 154(b) by 514 days.

(21) Appl. No.: 12/302,735

(22) PCT Filed: May 23, 2007

(86) PCT No.: PCT/JP2007/060506
§ 371 (c)(1),
(2), (4) Date: Jun. 23, 2009

(87) PCT Pub. No.: WO2007/138949
PCT Pub. Date: Dec. 6, 2007

(65) Prior Publication Data
US 2009/0323836 A1   Dec. 31, 2009

(30) Foreign Application Priority Data

May 29, 2006 (JP) .................................. 2006-148704

(51) Int. Cl.
*H04L 27/28* (2006.01)
(52) U.S. Cl.
USPC ............ 375/260; 375/259; 375/295; 375/316
(58) Field of Classification Search
USPC .................................. 375/260, 259, 295, 316
See application file for complete search history.

(56) References Cited

U.S. PATENT DOCUMENTS

| | | | |
|---|---|---|---|
| 6,249,250 B1 | 6/2001 | Namekata et al. | |
| 6,714,511 B1 | 3/2004 | Sudo et al. | |
| 7,336,598 B2 * | 2/2008 | Kakura | 370/208 |
| 2004/0022175 A1 * | 2/2004 | Bolinth et al. | 370/203 |
| 2004/0135723 A1 * | 7/2004 | Nakaya et al. | 342/372 |
| 2004/0160987 A1 | 8/2004 | Sudo et al. | |
| 2004/0246889 A1 | 12/2004 | Ogawa et al. | |
| 2005/0249303 A1 * | 11/2005 | Takano | 375/267 |
| 2005/0276242 A1 * | 12/2005 | Goto et al. | 370/328 |
| 2006/0007888 A1 * | 1/2006 | Lee et al. | 370/330 |
| 2006/0250935 A1 * | 11/2006 | Hamamoto et al. | 370/203 |

FOREIGN PATENT DOCUMENTS

| | | |
|---|---|---|
| CN | 1260649 A | 7/2000 |
| CN | 1605167 A | 4/2005 |
| JP | 11-205026 | 7/1999 |
| JP | 2002-374223 | 12/2002 |
| JP | 2003-023410 | 1/2003 |
| JP | 2005-159577 | 6/2005 |
| JP | 2005-318638 | 11/2005 |

OTHER PUBLICATIONS

Chinese language office action dated Jul. 27, 2011 and its English language translation for corresponding Chinese application 200780019937.1 cites the foreign patent documents above.
Korean language office action dated Jun. 15, 2012 and its English language translation issued in corresponding Korean application 1020117020455.

* cited by examiner

*Primary Examiner* — Kenneth Lam
(74) *Attorney, Agent, or Firm* — DLA Piper LLP (US)

(57) ABSTRACT

A radio base station 10 communicates with a mobile station by use of an OFDM scheme while using a signal as a transmission unit, the signal including an effective period for transmitting a data signal and a redundancy period for transmitting redundancy data based on the data signal transmitted during the effective period. The radio base station 10 measures an interference level of a signal transmitted from the mobile station and then changes the length of the redundancy period of the signal transmitted via a communication channel used for communications with the mobile station.

3 Claims, 7 Drawing Sheets

RADIO BASE STATION AND METHOD OF CONTROLLING RADIO BASE STATION

TECHNICAL FIELD

The present invention relates to an OFDM communication technique, and particularly relates to a technique for a symbol configuration as a transmission unit.

BACKGROUND ART

An orthogonal frequency division multiplexing (OFDM) scheme has been known as a multiplexing scheme for efficiently using is frequency bands. In the OFDM scheme, a guard interval is added to the beginning of an OFDM symbol. The guard interval is provided for preventing interference occurring between symbols due to influence of a delayed wave. When a delayed wave exceeding the guard interval is received, the reception quality deteriorates significantly due to the interference between symbols. In this respect, a longer guard interval is conventionally set in consideration of a possible maximum delayed wave (refer to Patent Document 1).

Patent Document 1: Japanese Patent Application Publication No. 2005-318636

DISCLOSURE OF THE INVENTION

The longer guard interval of OFDM symbol, however, leads to reduction in the communication rate (transmission rate) of the data signal such as user data or control data in the OFDM scheme. If the lengths of guard intervals are set to a uniform length for the possible maximum delayed wave length as in the case of the conventional technique, the lengths of the guard intervals become unnecessarily longer in individual communication channels in some cases. As a result, there occurs a problem that the communication rate of the data signal decreases.

The present invention is made in view of the aforementioned problem. An object of the present invention is thus to provide a radio base station for changing a guard interval length of a communication channel to an appropriate length so as to improve the communication rate without deteriorating the communication quality, in a case where an OFDM scheme is used, and also to provide a method of controlling a radio base station therefor.

In order to solve the aforementioned problem, the radio base station according to the present invention is a radio base station that communicates with a mobile station by use of an orthogonal frequency division multiplexing scheme while using a signal as a transmission unit, the signal including an effective period for transmitting a data signal and a redundancy period for transmitting redundancy data based on the data signal transmitted during the effective period. The radio base station comprises: an interference level measurement unit configured to measure an interference level of a signal transmitted from the mobile station; and a changing unit configured to change the length of the redundancy period of a signal transmitted via a communication channel used for communications with the mobile station, in accordance with the interference level measured by the interference level measurement unit.

Furthermore, the method of controlling a radio base station according to according to the present invention is a method of controlling a radio base station that communicates with a mobile station by use of an orthogonal frequency division multiplexing scheme while using a signal as a transmission unit, the signal including an effective period for transmitting a data signal and a redundancy period for transmitting redundancy data based on the data signal transmitted during the effective period. The method comprises the steps of: measuring an interference level of a signal transmitted from the mobile station; and changing the length of the redundancy period of a signal transmitted via a communication channel used for communications with the mobile station, in accordance with each interference level measured in the step of measuring the interference level.

In the present invention, a radio base station and a mobile station perform communications in accordance with the orthogonal frequency division multiplexing (OFDM) scheme. In the OFDM scheme, a signal including an effective period and a redundancy period (guard interval) is used as the transmission unit (transmission symbol). The effective period is provided for transmitting a data signal, and the redundancy period is provided for avoiding interference due to a delayed wave. The radio base station changes the redundancy period (guard integral) in accordance with the interference level of the signal transmitted from the mobile station, the redundancy period being for a communication channel used for communications with the mobile station. The guard interval length for the communication channel can be therefore changed to an appropriate length in accordance with the interference level.

In addition, according to an aspect of the present invention, the radio base station comprises a control signal transmitter configured to transmit a control signal via a control channel commonly used by a plurality of the mobile stations performing communications by use of the orthogonal frequency division multiplexing scheme, wherein the changing unit shortens the length of the redundancy period of the signal transmitted via a communication channel used for communications with the mobile station to be the length of the redundancy period of the signal transmitted via the control channel.

Accordingly, the guard interval length of the communications via the communication channel can be changed to an appropriate length in accordance with the interference level so that the communication rate or the communication channel is enhanced more than the communication rate of the control channel.

Moreover, according to an aspect of the present invention, the radio base station further comprises: a transmission and reception unit configured to transmit and receive a signal of communications by using an adaptive array antenna, the communications being performed using the orthogonal frequency division multiplexing scheme: and an interference suppressor configured to adjust a directivity pattern for the mobile station, by the adaptive array antenna and thereby to suppress interference of the signal transmitted from the mobile station.

Accordingly, the guard interval length of the communications via the communication channel can be changed to an appropriate length in accordance with the interference level while actively suppressing the interference of the signal transmitted from the mobile station.

In addition, according to an aspect of the present invention, in the radio base station, the interference suppressor causes, by use of the adaptive array antenna, a null to be directed in a direction of arrival of an interference wave of the signal transmitted from the mobile station, and thereby suppresses the interference of the signal transmitted from the mobile station.

Accordingly, the guard interval length of the communications via the communication channel can be changed to an appropriate length in accordance with the interference level while actively suppressing the interference of the signal transmitted from the mobile station.

BEST MODE FOR CARRYING OUT THE INVENTION

Hereinafter, a preferred embodiment of the present invention will be described in detail with reference to drawings.

A radio base station according to the embodiment of the present invention includes an adaptive array antenna, and performs radio communications with a mobile station by use of an orthogonal frequency division multiplexing (OFDM) scheme.

[Configuration of Radio Base Station]

Figure 1:
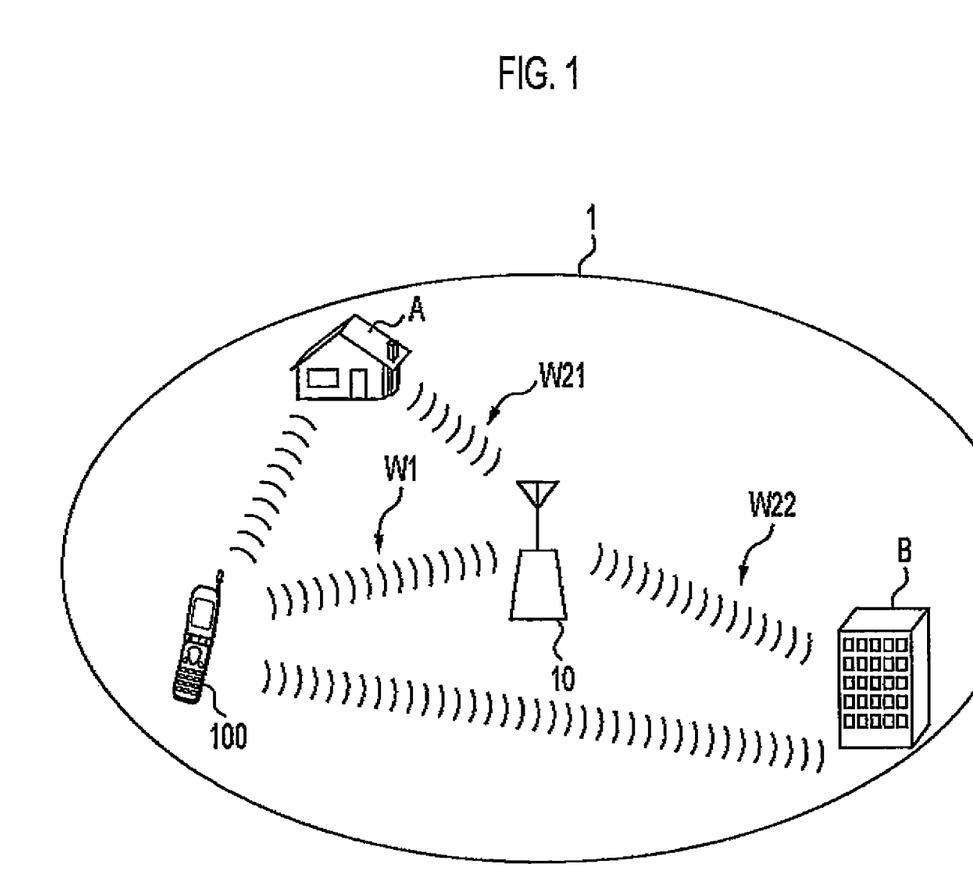
FIG. 1 is a diagram showing a situation where a mobile station requests, by use of a control channel, a radio base station to establish a link.

FIG. 1 shows a situation when a mobile station 100 located in a cell 1 requests, via a control channel, a radio base station 10 to establish a link. As shown in FIG. 1, the signals transmitted from the mobile station 100 directly arrive at the radio base station 10 (desired wave W1), or bounce off obstacle A, B or the like and then arrive at the radio base station 10 with some delay (delayed waves W21, W22). As described, since multiple propagation paths of the signals exist, the communication quality often deteriorates due to multipath interference in which the received signals interfere with one another.

Figure 2:
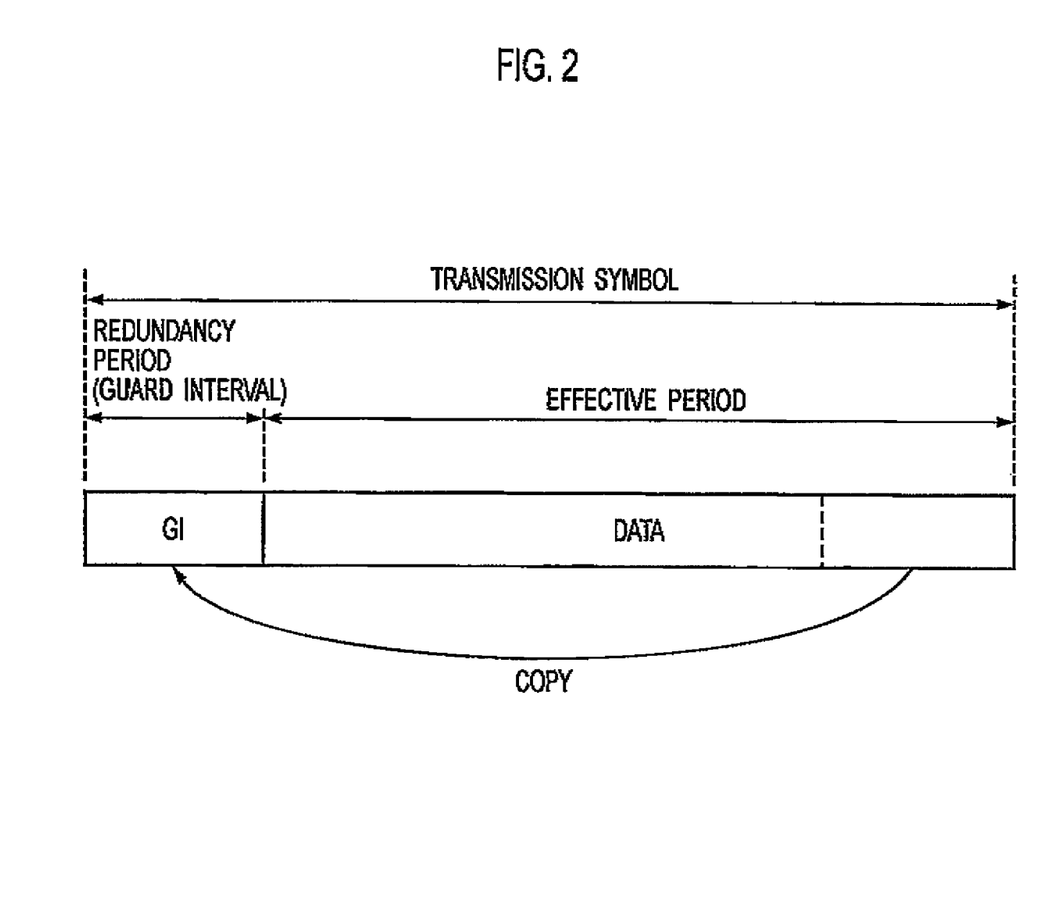
FIG. 2 is a diagram for describing a transmission unit of an OFDM signal.

As shown in FIG. 2, in the OFDM scheme, in order to reduce the influence of the multipath interference, a transmission symbol, which is a transmission unit, includes an effective period in which a data signal is transmitted and a redundancy period that is called a guard interval (guard time) as a period of time to absorb a delayed wave.

As shown in FIG. 2, the guard interval is a data signal formed of a copy of a part of the last half of the data signal transmitted during the effective period. In the OFDM scheme, if the guard interval length is longer than the delay time of a delayed wave, the correct data signal is demodulated from the received transmission symbol.

Furthermore, in the case of a control channel, since the control channel Ls used for communications with not only the mobile station 100 shown in FIG. 1, but also another mobile station not shown in the drawing yet located in the same cell, any type of delayed waves needs to be taken into consideration. For this reason, the guard interval of a data signal transmitted and received via the control channel is set in consideration with a possible maximum delayed time.

Figure 3:
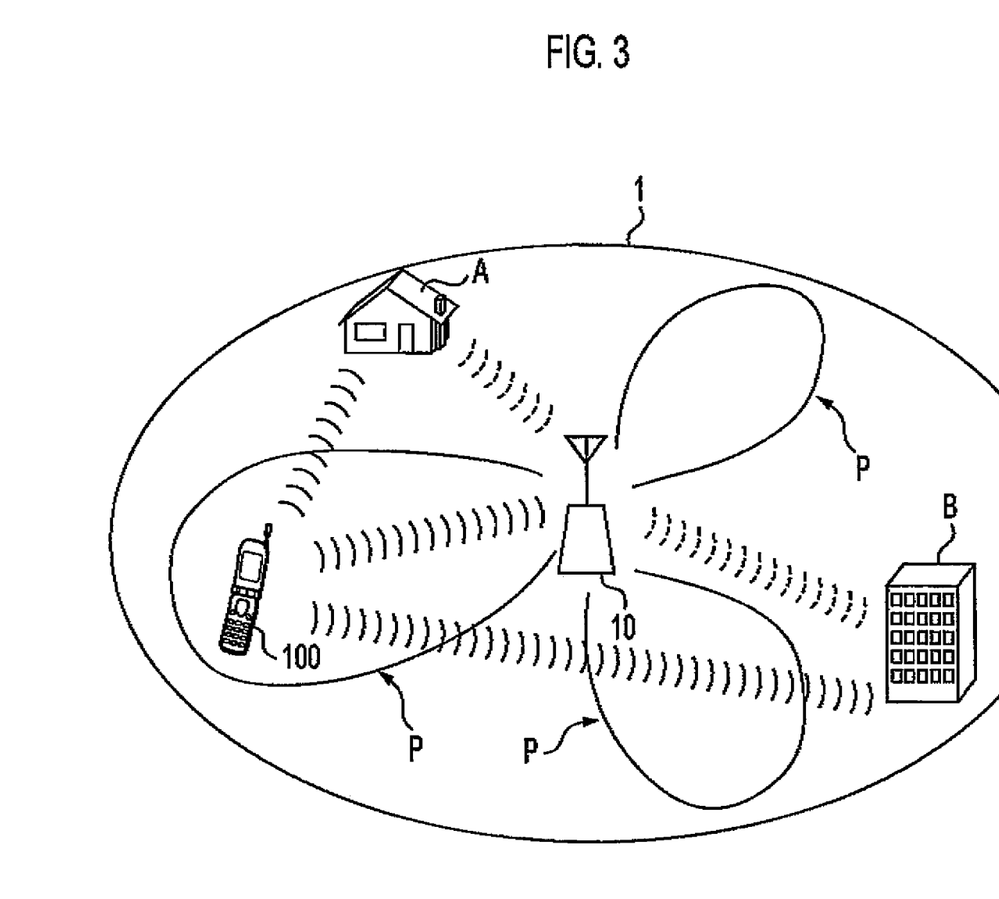
FIG. 3 is a diagram showing a situation where the mobile station communicates with the radio base station by using an assigned communication channel.

FIG. 3 shows a situation where the mobile station 100 to which a communication channel is assigned and the radio base station 10 communicate with each other via the assigned communication channel. The radio base station 10 adjusts a weight of each antenna element of an adaptive array antenna and forms a directivity pattern P with respect to the mobile station 100. The radio base station 10 performs a control by null-steering of the adaptive antenna array so that the direction of arrival of a delayed wave can be directed to the null. When the direction of arrival of the delayed wave is directed to the null, the delayed wave arriving at the radio base station 10 is attenuated, so that the interference between the desired wave and the delayed wave can be suppressed. In other words, when an appropriate directivity pattern P for the mobile station 100 is formed, the interference between the desired wave and the delayed wave can be suppressed, and thereby the influence of the multipath interference can be effectively reduced even if the length of the guard interval is shortened.

In this respect, when the interference level is low, the radio base station 10 shortens the length of the guard interval of a transmission symbol transmitted via a communication channel during the communications with the mobile station 100 via the communication channel. Specifically, the radio base station 10 shortens the length of the guard interval included in the transmission symbol transmitted via the communication channel to be less than the length of the guard interval of the transmission symbol transmitted via the control channel. When the length of the guard interval is shortened, the number of symbols that can be transmitted during the transmission time of a carrier wave can be increased, which in turn improves the communication rate.

Note that in this embodiment, only one mobile station is shown in the drawings for the convenience of description, however the present invention can be applied to a situation where the radio base station 10 communicates with multiple mobile stations simultaneously or where OFDMA, which is a multiple access scheme using an OFDM scheme, is employed.

Figure 4:
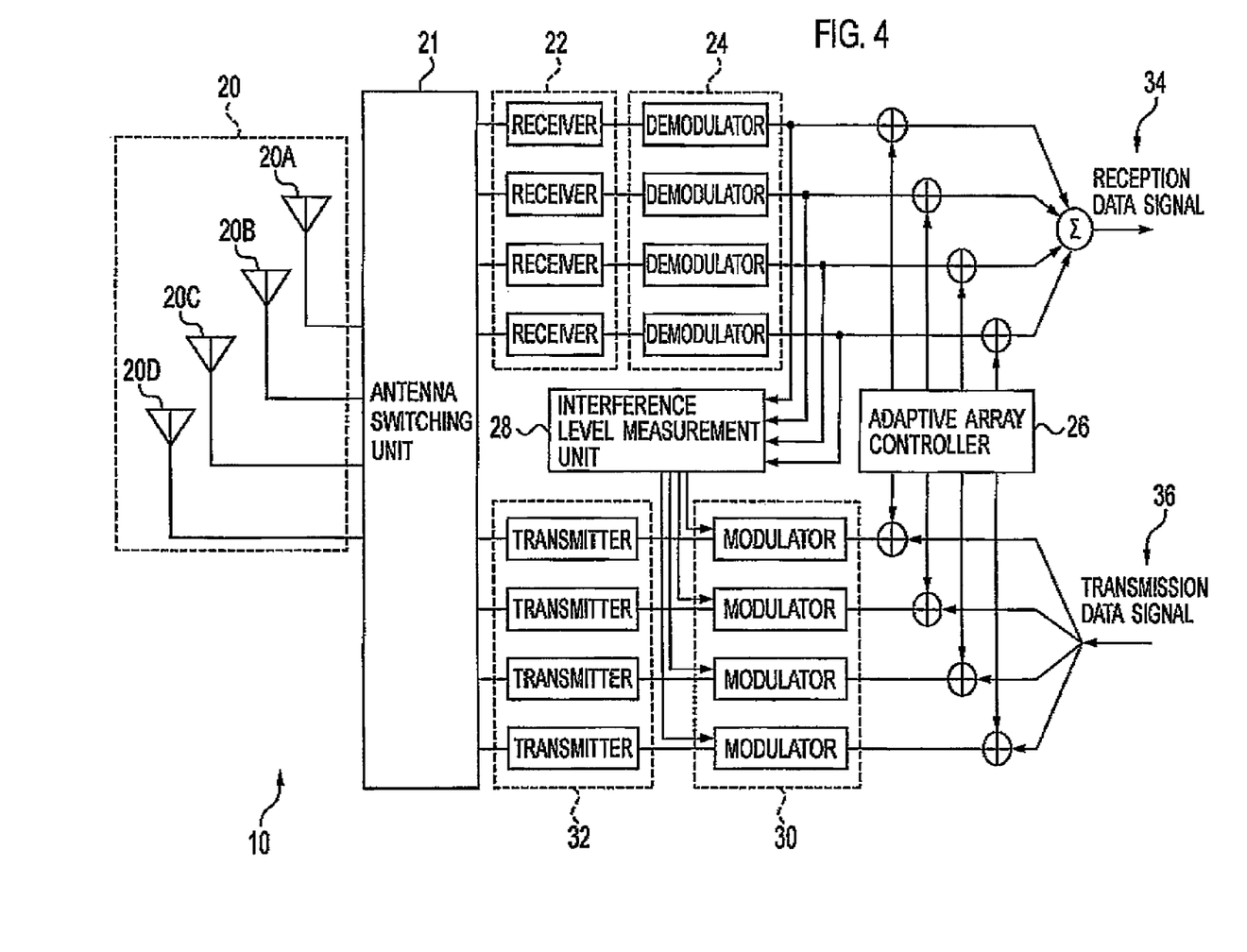
FIG. 4 is a block configuration diagram of the radio base station.
Figure 5:
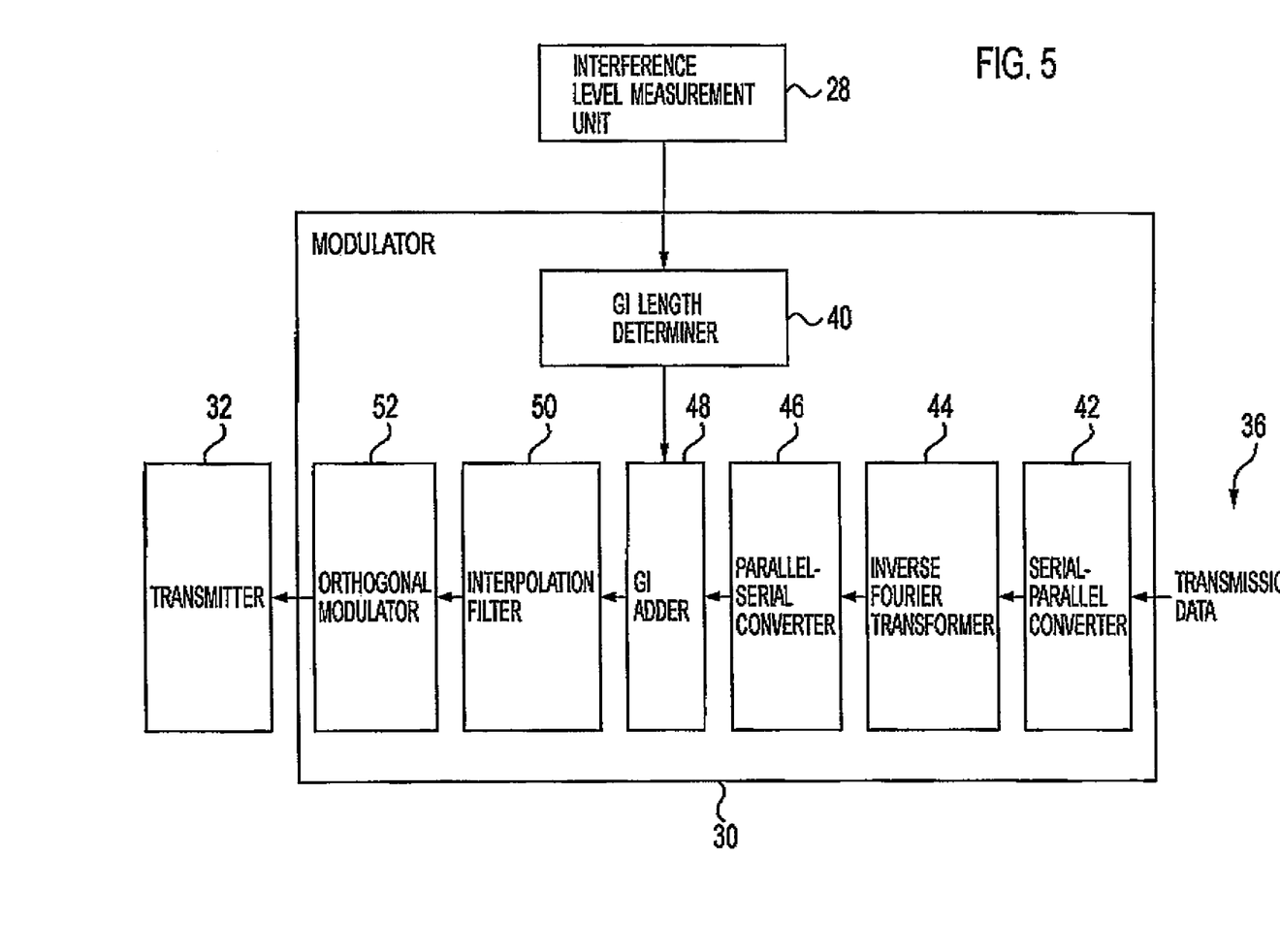
FIG. 5 is a block configuration diagram of a modulator.

Next, a configuration of the radio base station 10 will be described. FIG. 4 is a block configuration diagram of the radio base station 10. As shown in FIG. 4, the radio base station 10 includes an adaptive array antenna 20, an antenna switching unit 21, receivers 22, demodulators 24, an adaptive array controller 26, an interference level measurement unit 28, modulators 30 and transmitters 32. FIG. 5 shows a block configuration diagram of the modulator 30.

The antenna switching unit 21 switches processing of transmission and reception by controlling the adaptive array is antenna 20 in a time-sharing manner. Firstly, the processing of receiving an OFDM signal transmitted from the mobile station 100 will be described.

The OFDM signal transmitted from the mobile station 100 by using a communication channel is received by the adaptive array antenna 20 formed of multiple antenna elements 20A, 20B, 20C and 20D. The OFDM signal received by each of the antenna elements of the adaptive array antenna 20 is converted into an OFDM baseband signal after being amplified, converted into an intermediate frequency and then subjected to A/D Conversion by the corresponding one of the receivers 22.

The OFDM baseband signal outputted from each of the receivers 22 is sampled over the effective period length at Ts/N sampling intervals in each of the modulators 24, provided that the effective period length of a transmission symbol is Ts and the number of carrier waves of OFDM is N in this embodiment. The sampled data signals are outputted as the N number of signals after being subjected to serial-parallel conversion.

Discrete Fourier transform (DFT) is performed on the N number of outputted sample data. Then, the complex symbol string corresponding to each of the carrier waves is extracted. The extracted complex symbol string is outputted as an OFDM demodulation signal of a frequency range after being subjected to parallel-serial conversion.

The multiple OFDM demodulation signals outputted from the demodulators 24 are multiplied by the complex weights calculated for the respective antenna elements in the adaptive array controller 26. Moreover, the multiple OFDM demodulation signals are combined in the adaptive array controller 26. The combined OFDM demodulation signal is outputted as a reception data signal 34.

In the adaptive array controller 26, the complex weights are updated on the basis of the demodulation signals corresponding to the respective antenna elements of the adaptive array antenna 20. As the algorithm for updating the complex weights, a known algorithm such as MMSE, CMA, MSN or DCMP can be used.

The radio base station 10 (the adaptive array controller 26) causes the main lobe to be directed in the direction of arrival of the desired wave W1 by updating the weight of each of the antenna elements of the adaptive array antenna 20. Moreover, the radio base station 10 causes the null to be directed in the direction of arrival of the interference wave. Note that the interference wave herein includes a correlated interference wave such as a delayed wave or the like arrived after bouncing off a building and a non-correlated interference wave such as a signal or the like from another mobile station. In this embodiment, the adaptive array controller 26 constitutes an interference suppressor.

The interference level measurement unit 28 measures the signal strength of the desired wave and the interference wave on the basis of the demodulation signal corresponding to each of the antenna elements of the adaptive array antenna 20. Moreover, the interference level measurement unit 28 calculates, for example, a signal strength ratio (SIR) as the interference level of the desired wave and the interference wave incident on the adaptive array antenna 20 on the basis of the measured signal strength.

Next, a description will be given for a process of transmitting an OFDM signal by the radio base station 10 to the mobile station 100.

(1) Determination Process for Guard Interval Length

To begin with, a description will be given for a process of determining a guard interval length (GI length) of an OFDM signal transmitted via a communication cannel.

Figure 6:
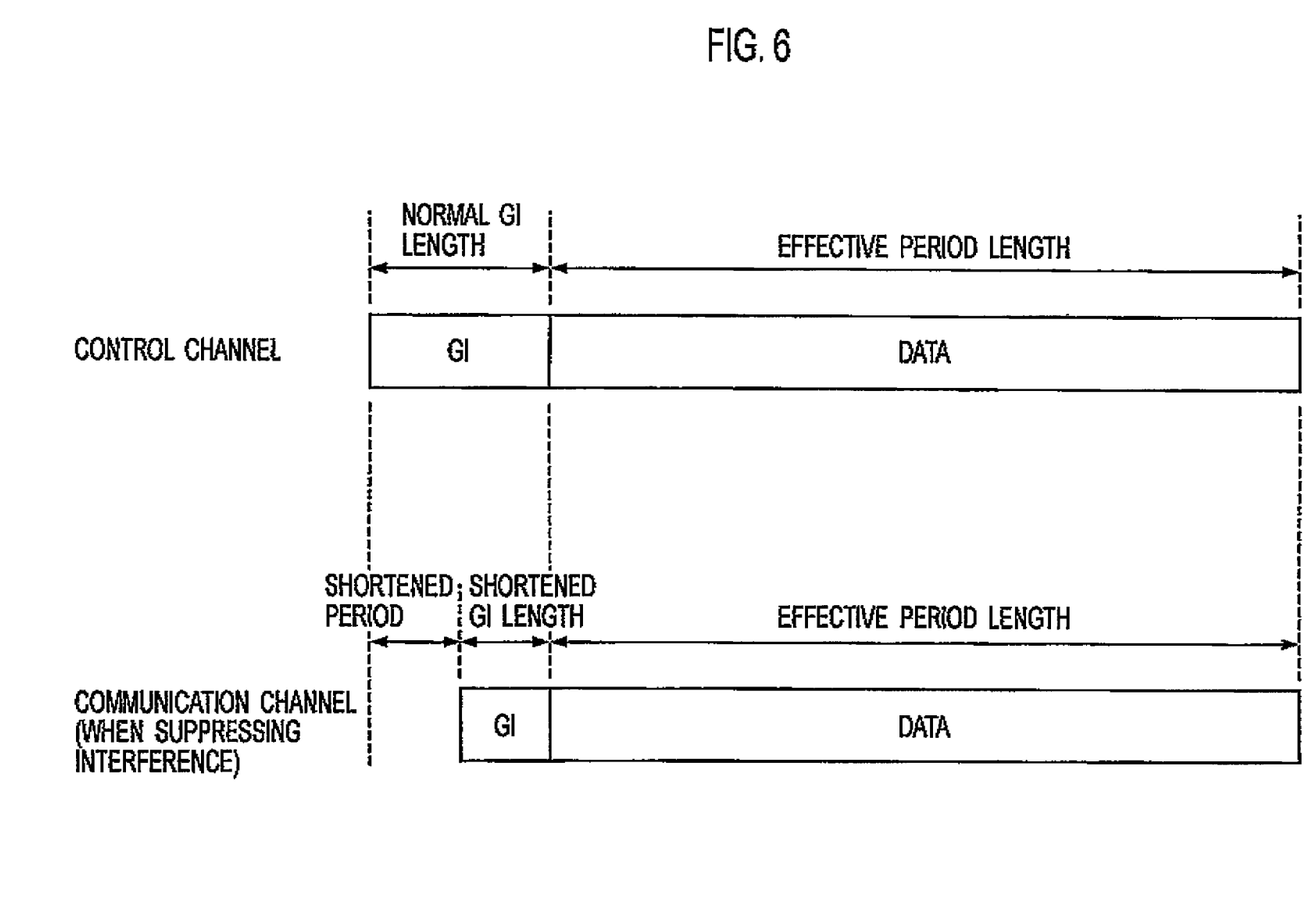
FIG. 6 is a diagram showing a comparison between a transmission symbol of a control channel and a transmission symbol of a communication channel in an environment where interference is suppressed.

As shown in FIG. 5, a GI length determiner 40 determines a guard interval length in accordance with the interference level outputted from the interference level measurement unit 28. As shown in FIG. 6, the length (normal GI length) to be applied to a control channel and the length (shortened GI length) to be applied when interference is suppressed in the communication channel are prepared in advance. Incidentally, each of the lengths may be stored in a storage unit of a memory or the like.

In a case where the signal intensity ratio (SIR) of the desired wave and the interference wave incident on the adaptive array antenna 20 is used as the interference level, for example, so the guard interval length can be changed to a shortened GI length if the value of SIR is smaller than a predetermined threshold value.

Incidentally, the processing in the GI determiner 40 may be performed by a processor for controlling the radio base station 10 and a memory. In this case, the processor accesses the memory and reads the predetermined threshold value, and then compares the interference level with the read threshold value. If the interference level is found to be smaller as a result of the comparison, the processor accesses the memory again and reads the value of the shortened GI length. Then, the processor sets the guard interval length on the basis of the read value.

(2) Modulation Process for Transmission Data Signal

Next, a process of modulating a transmission data signal will be described.

As shown in FIG. 5, a transmission data signal 36 is converted into a complex symbol string corresponding to multiple bits and then multiplied by the complex weights calculated for each of the antenna elements in the adaptive array controller 26. The generated complex symbol string is subjected to serial-parallel conversion in a serial-parallel converter 42 and then outputted as the N number of symbol strings.

The outputted N number of symbol strings are subjected to batch conversion in an inverse Fourier transformer 44, and thereby, the N number of sample values of ODFM symbols are generated. The generated sample values are subjected to parallel-serial conversion in a parallel-serial converter 46 and then outputted as a complex OFDM baseband signal of continuous time domain.

A GI adder 48 adds a data portion to the top of the symbol for the complex OFDM baseband signal outputted from the parallel-serial converter 46 on the basis of a value Tg of the GI length determined in the GI length determiner 40, the data portion being equivalent to the length of the last half Tg of each symbol off the complex ODFM baseband signal. The complex OFDM baseband signal to which the GI added thereto passes through an interpolation filter 50. In an orthogonal modulator 52, each of a real part and an imaginary part of the complex OFDM baseband signal is multiplied by a carrier wave frequency, and then the OFDM signal of the carrier band is outputted. In this embodiment, the GI length determiner 40 and the GI adder 48 configure a changing unit.

The outputted OFDM signal is transmitted to the mobile station 100 via the adaptive array antenna 20 after being amplified in the transmitter 32.

[Operation of Radio Base Station]

Next, a description will be given for an operation of the radio base station 10 to communicate with the mobile station 100 while controlling the GI length.

Figure 7:
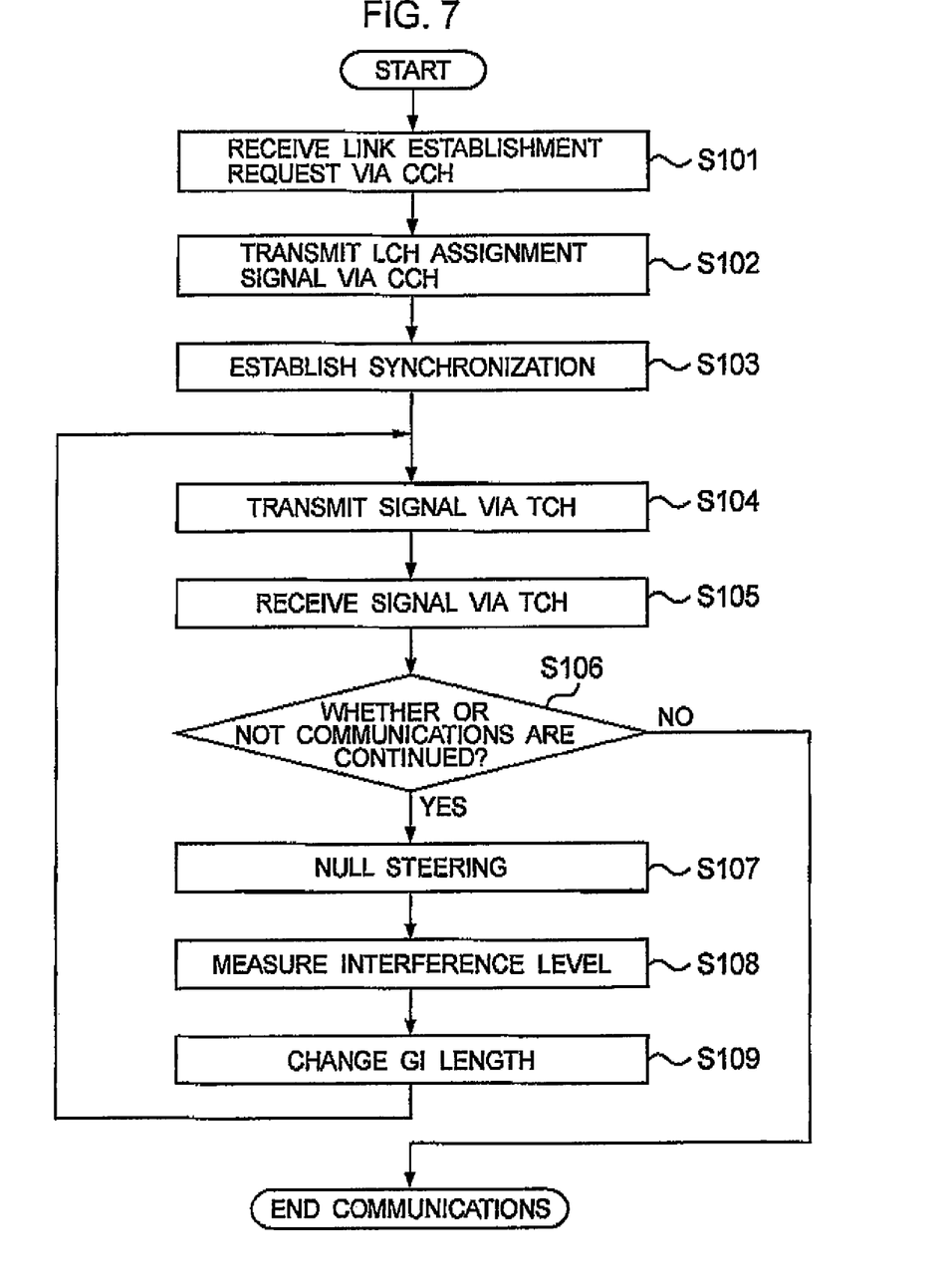
FIG. 7 is a flowchart of processing communications in the radio base station.

As shown in FIG. 7, the radio base station 10 receives a link channel establishment request signal from the mobile station 100 via a control channel (CCH) (S101). The radio base station 10 detects an open communication channel (open TCH) and then transmits a Clink channel assignment signal (LCH assignment signal) for specifying the open TCH, via the CCH to the mobile station 100 (S102). In the processing from S101 to S102, the guard interval length of the OFDM signal for the control channel is a fixed length in accordance with a predicted maximum delay time in the cell.

Next, the mobile station 100 transmits a synchronization burst signal to the base station via the assigned TCH. Moreover, the mobile station 100 receives a synchronization burst signal from the radio base station 10 and thereby, the synchronization between the radio base station 10 and the mobile station 100 is established (S103).

When the synchronization is established, the radio base station 10 transmits an OFDM signal to the mobile station 100 via the TCH, and also receives an OFDM signal from the mobile station 100 via the TCH (S104, S105).

If the communications between the radio base station 10 and the mobile station 100 are to be continued (S106: Y), the radio base station 10 forms a directivity pattern P that forms the null in the direction of arrival of an interference wave with respect to a desired wave transmitted from the mobile station 100, on the basis of the input entered when the OFDM signal transmitted from the mobile station 100 is received by the adaptive array antenna 20 (S107).

Then, the radio base station 10 measures the interference level of the desired wave and the interference wave (S108). The radio base station 10 changes the guard interval length of the TCH to a length shorter than the guard interval length of the CCH, in a case where the communications are in a state where the interference is suppressed (S109). Moreover, the radio base station 10 repeats the processing from the processing in S104 with the OFDM signal configured of the changed GI length.

In contrast, in a case where the communications between the radio base station 10 and the mobile station 100 are determined to be not continued (S106: N), the radio base station 10 ends the communications with the mobile station 100.

According to the radio base station in the case of the embodiment of the present invention described above, a guard interval length (GI length) of a communication channel (TCH) can be changed to an appropriate length so as to improve the communication rate, while not deteriorating the communication quality, in a case where an OFDM scheme is used.

Note that the present invention is not limited to the aforementioned embodiment. In this embodiment, the guard interval length is shortened on the basis of the result of a comparison between the interference level of a desired wave and an interference wave, and a predetermined threshold value. However, the present invention is not limited to this. For example, it is possible to control the guard interval length in a more detailed manner by storing, in a memory, a large number of guard interval lengths corresponding to the values of interference levels, and then reading a guard interval length corresponding to the measured interference level.

It should be noted that the entire contents of Japanese Patent Application No. 2006-148704 (filed on May 29, 2006) are incorporated herein by reference.

INDUSTRIAL APPLICABILITY

As described above, a radio base station and a method of controlling a radio base station according to the present invention are advantageous in radio communications such as mobile communications since a guard interval length for a communication channel can be changed to an appropriate length so that the communication rate is improved without deteriorating the communication quality, in a case where an OFDM scheme is used.

The invention claimed is:

1. A radio base station that communicates with a mobile station by use of an orthogonal frequency division multiplexing scheme while using a signal as a transmission unit, the signal including an effective period for transmitting a data signal and a redundancy period for transmitting redundancy data based on the data signal transmitted during the effective period, the radio base station comprising:

an adaptive array antenna, a calculator configured to calculate a weight for transmitting and receiving a signal via communication channel assigned to the mobile station;

a forming unit configured to form a null to be directed in an arrival direction of an interference wave of a signal transmitted from the mobile stations by use of the calculated weight, and thereby forms a directivity pattern for suppressing the interference of the signal transmitted from the mobile station;

an interference level measurement unit configured to measure an interference level of a signal received from the mobile station when the directivity pattern is formed; and a changing unit configured to change the length of the redundancy period of a signal transmitted via a communication channel assigned to the mobile station, in accordance with the interference level measured by the interference level measurement unit.

2. The radio base station according to claim 1, further comprising a control signal transmitter configured to transmit a control signal via a control channel commonly used by a plurality of mobile stations performing communications by use of the orthogonal frequency division multiplexing scheme, wherein the changing unit shortens the length of the redundancy period of a signal transmitted via the communication channel used for communications with the mobile station to be less than the length of the redundancy period of a signal transmitted via the control channel.

3. A method of controlling a radio base station that includes an adaptive array antenna and that communicates with a mobile station by use of an orthogonal frequency division multiplexing scheme while using a signal as a transmission unit, the signal including an effective period for transmitting a data signal and a redundancy period for transmitting redundancy data based on the data signal transmitted during the effective period, the method comprising the steps of:

calculating a weight for transmitting and receiving a signal via a communication channel assigned to the mobile station;

forming a null to be directed in an arrival direction of an interference wave of a signal transmitted from the mobile stations by use of the calculated weight, and thereby forming a directivity pattern for suppressing the interference of the signal transmitted from the mobile station;

measuring an interference level of a signal received from the mobile station when the directivity pattern is formed; and changing the length of the redundancy period of a signal transmitted via a communication channel assigned to the mobile station, in accordance with each interference level measured in the step of measuring the interference level.

* * * * *